United States Patent
Abedin et al.

(10) Patent No.: US 9,672,096 B2
(45) Date of Patent: Jun. 6, 2017

(54) NETWORK OF DEVICES FORMING A DIAGNOSTIC SYSTEM

(71) Applicant: SAGEMCOM ENERGY & TELECOM SAS, Rueil-Malmaison (FR)

(72) Inventors: Armand Abedin, Rueil-Malmaison (FR); Bruno Corlay, Rueil-Malmaison (FR); Djelal Raouf, Rueil-Malmaison (FR); Nhon Chu, Rueil-Malmaison (FR)

(73) Assignee: SAGEMCOM ENERGY & TELECOM SAS, Rueil-Malmaison (FR)

( * ) Notice: Subject to any disclaimer, the term of this patent is extended or adjusted under 35 U.S.C. 154(b) by 90 days.

(21) Appl. No.: 14/381,447

(22) PCT Filed: Feb. 19, 2013

(86) PCT No.: PCT/EP2013/053261
§ 371 (c)(1),
(2) Date: Aug. 27, 2014

(87) PCT Pub. No.: WO2013/127660
PCT Pub. Date: Sep. 6, 2013

(65) Prior Publication Data
US 2015/0100828 A1   Apr. 9, 2015

(30) Foreign Application Priority Data

Feb. 28, 2012 (FR) ..................... 12 51806

(51) Int. Cl.
*G06F 11/00* (2006.01)
*G06F 11/07* (2006.01)
*H04L 12/24* (2006.01)

(52) U.S. Cl.
CPC ...... *G06F 11/0793* (2013.01); *G06F 11/0709* (2013.01); *H04L 12/24* (2013.01); *H04L 41/0206* (2013.01)

(58) Field of Classification Search
CPC . G06F 11/079; G06F 11/0709; H04L 41/0631
(Continued)

(56) References Cited

U.S. PATENT DOCUMENTS 8,700,028 B2 * 4/2014 Harris ................. H04L 12/2697
455/419
9,002,787 B2 * 4/2015 Ferrazzini ........... H04L 41/0213
707/625
(Continued)

FOREIGN PATENT DOCUMENTS

EP          2 043 298 A2   4/2009
WO    WO 2011/123328 A1   10/2011

OTHER PUBLICATIONS

Mar. 28, 2013 Search Report issued in International Patent Application No. PCT/EP2013/053261 (with translation).
(Continued)

*Primary Examiner* — Elmira Mehrmanesh
(74) *Attorney, Agent, or Firm* — Oliff PLC; R. Brian Drozd

(57) ABSTRACT

The present invention relates to the field of systems and methods of diagnosis of apparatuses constituting a vast machine-to-machine communication network. The system proposed is based on a virtual network linking the various apparatuses so as to form a hierarchical tree. This virtual network is reliant on the network for real communication between the apparatuses. However, the topology of the virtual network is independent of that of the real network. Each apparatus includes a diagnostic agent offering local self-diagnostic capabilities. Each apparatus enables offering a state of its operation and of the operation of the entire (Continued)

sub-network of which it is the father. The self-diagnostic capabilities of an apparatus are implemented either locally by the apparatus, or within apparatuses of its close network environment as a function of the capabilities of the various items of equipment.

8 Claims, 3 Drawing Sheets

(58) Field of Classification Search
USPC .......................................................... 714/37
See application file for complete search history.

(56) References Cited

U.S. PATENT DOCUMENTS

| | | | | | |
|---|---|---|---|---|---|
| 2005/0055397 | A1* | 3/2005 | Zhu | ..................... | H04L 41/0806 709/200 |
| 2007/0207800 | A1* | 9/2007 | Daley | ................. | H04L 12/2602 455/425 |
| 2008/0114570 | A1* | 5/2008 | Li | ....................... | H04L 41/0233 702/186 |
| 2008/0288630 | A1* | 11/2008 | Merat | .................. | G06F 11/1451 709/224 |
| 2009/0089300 | A1* | 4/2009 | Vicente | ............... | H04L 41/0893 |
| 2010/0185679 | A1 | 7/2010 | Ferrazzini et al. | | |
| 2011/0087917 | A1* | 4/2011 | He | ....................... | H04L 41/0681 714/2 |
| 2011/0228665 | A1* | 9/2011 | Kumar | ................... | G06Q 10/06 370/216 |
| 2013/0031234 | A1* | 1/2013 | Alfano | ................ | H04L 41/0206 709/223 |

OTHER PUBLICATIONS

Translation of Sep. 2, 2014 International Preliminary Report on Patentability issued in International Patent Application No. PCT/EP2013/053261.

* cited by examiner

NETWORK OF DEVICES FORMING A DIAGNOSTIC SYSTEM

The present invention relates to the field of systems and methods for diagnosing apparatuses that constitute a vast machine-to-machine communication network. More particularly, the invention will relate to the hierarchical architecture of a diagnostic network.

The invention concerns a large number of apparatuses operating in a network. These apparatuses may for example be in the form of sensors in a town or in a building. The apparatuses are characterised by low resources. They are typically designed to be battery-operated. It is therefore advantageous for them to use as few resources as possible, and more particularly energy.

When administering a network of apparatuses of this type, it is necessary to be able to monitor the network and diagnose its operating status. For this purpose, various diagnostic systems are known. These systems are generally based on a central diagnostic server that centralises the alerts from the apparatuses of the network. Reference can be made to SNMP systems (Simple Network Management Protocol), and to the system known by the name of "Automatic Computing" by IBM, which comprises a self-repair mechanism for on-board systems. Reference can also be made to the OMA-DM system (Open Mobile Alliance—Device Management).

This server sends requests to each apparatus forming the network of apparatuses to be diagnosed. For this purpose, the diagnostic server establishes point-to-point communications destined for each apparatus. The diagnostic operations are controlled by the central server. This requires each diagnostic phase to implement a set of communications between the central server and the various monitored apparatuses.

When the size of the network administered increases, the communication needs involved in this diagnosis increase exponentially. It also requires the use of a large number of communication resources within the administered apparatuses.

The invention proposes a system and methods for hierarchical diagnosis that enable limiting the resources necessary for its operation within each involved apparatus. A further objective is to be able to take charge of a very large-scale network. The proposed system is based on a virtual network that links the various apparatuses in order to form a hierarchical tree. This virtual network is based on the network of real communication between the apparatuses. However, the topology of the virtual network is independent from that of the real network. Each apparatus comprises a diagnostic agent that provides local self-diagnostic capacities. Each apparatus enables providing a state of its own operation and of the operation of the entire sub-network of which it is the father. The self-diagnostic capacities of an apparatus are implemented either locally on the apparatus, or within apparatuses of its close network environment, depending on the capacities of the various devices.

The hierarchical communication between the server and the apparatuses allows reducing the communications necessary for administration of the system. The local diagnostic and local self-repair capacities allow reducing the number of necessary communications.

The invention relates to a device comprising communication means for communicating within a physical communication network having a set of apparatuses which comprises local self-diagnostic means; means for controlling a virtual hierarchical communication network with the set of apparatuses within the physical communication network, and means for determining a diagnostic status relating to the result of the local self-diagnostic means and of the self-diagnostic means of the apparatuses that are dependent on said device in said hierarchical communication network.

According to a particular embodiment of the invention, the self-diagnostic means comprise a set of diagnostic agents relating to local functionalities of the apparatus.

According to a particular embodiment of the invention, the self-diagnostic means further comprise diagnostic agents relating to external functionalities belonging to other apparatuses of the communication network.

According to a particular embodiment of the invention, operation of the self-diagnostic means is governed by a set of dynamic rules.

According to a particular embodiment of the invention, the self-diagnostic means further comprise self-repair means.

According to a particular embodiment of the invention, the self-diagnostic means further comprise means for responding to a request demanding the status of the entire sub-network of which the device is the root within the virtual communication network.

According to a particular embodiment of the invention, the self-diagnostic means further comprise means for uplinking a locally detected malfunction according to the type of malfunction.

According to a particular embodiment of the invention, the self-diagnostic means further comprise means for producing a diagnosis in an autonomous self-diagnostic mode, by using diagnostic agents that represent only local functionalities.

According to a particular embodiment of the invention, the self-diagnostic means further comprise means for producing a diagnosis according to a recursive self-diagnostic mode, by using diagnostic agents that represent local functionalities and one external object.

According to a particular embodiment of the invention, the self-diagnostic means further comprise means for producing a diagnosis according to a collaborative self-diagnostic mode, by using diagnostic agents that represent local functionalities and multiple external objects.

The invention also relates to a network of apparatuses as just described briefly above, which together form a system for diagnosing said network.

The aforementioned features of the invention, as well as others, will become more apparent from reading the following description of an embodiment, said description being provided in relation to the accompanying drawings, in which.

The invention falls within the context of large-scale networks of devices communicating in a machine-to-machine mode. The devices may be apparatuses with very low resources, such as simple sensors that will be replaced when they run out of energy. These devices have communication capacities typically involving wireless communication. This can be any technology of the Bluetooth or Wi-Fi type, or wireless telephony communication of the GSM type. Typically, the networks concerned will be heterogeneous. The physical network can therefore be based on a set of wired or wireless technologies for connecting the various devices.

Figure 1:
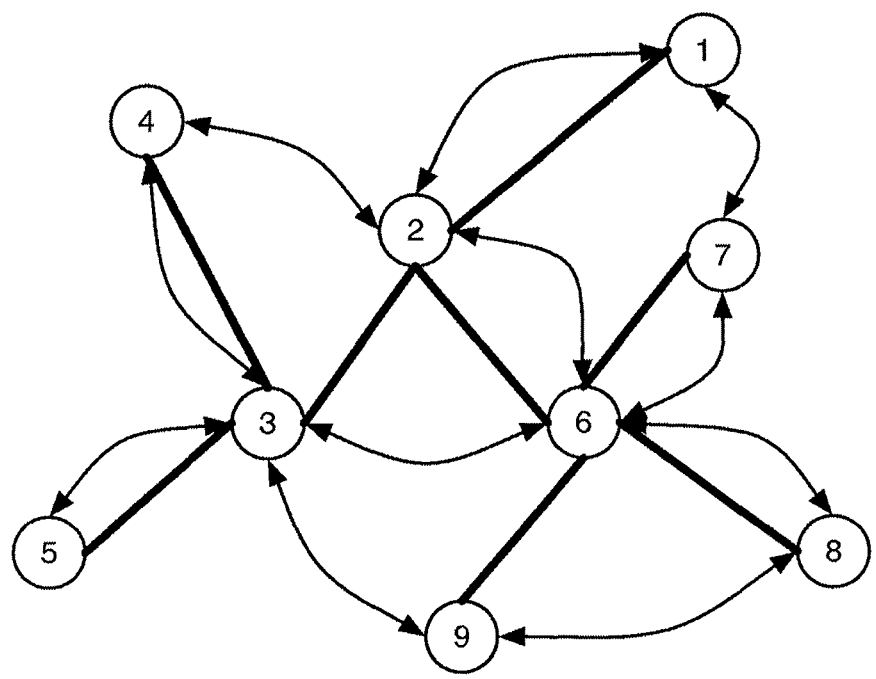
FIG. 1 illustrates the concept of a virtual network of real networks used in an embodiment of the invention.

FIG. 1 shows a network of nine devices. These devices are interconnected by a physical communication network. These physical communication links are shown in the drawing by a set of double arrows. It can be seen that, according to the physical network, the node 1 for example can communicate with the node 2 and the node 7. The node 2, for its part, can communicate with the nodes 4, 1 and 6, and so on. This physical network can have any type of topology.

A virtual communication network is constructed on top of this physical network. This virtual communication network has a typically hierarchical topology. This topology is implemented in the form of a tree. The virtual network therefore typically has a root. This root constitutes the master diagnostic server of the system. A hierarchical path then connects this root to the set of nodes of the network. In the example in FIG. 1, the node 1 is the root node. The root node 1 has a single son, which is the node 2. Although physically connected to the node 7, the node 1 is not the father of the node 7 in the virtual network. In said virtual network, the path between the node 1 and the node 7 passes via the nodes 2 and 6. It is also found that the node 2 is connected to the node 3 in the virtual network, whereas these two nodes are not physically connected.

The self-diagnostic approach designed for large-scale machine-to-machine networks is based on a collection of local diagnostic agents that carry out the diagnostic operations in the apparatuses. These agents operate in an ecosystem known as the self-diagnostic module. They form a virtual collaboration network according to a basic configuration that is self-configurable according to defined and modifiable rules. The agents monitor the state of their devices and, if applicable, carry out the diagnostics and corrections autonomously, and notify the hierarchical level above them of the changes in operating states.

This system enables, at the top of each hierarchical level of this network, including at the top of the system, having an overview of the operating state of the underlying devices, taking into account the fact that each operating state at a higher level incorporates a summarised state of devices at lower levels.

Each device in the network comprises its own self-diagnostic module 2.6 that executes its own set of diagnostic agents.

The self-diagnostic modules implement all the usual functions which permit execution of the diagnostic agents, and ensure conformity with the specific diagnostic strategies relating to the concerned devices.

The purpose of the self-diagnostic modules is to implement the following functions: self-diagnostics with warning notifications, diagnostics of remote and/or autonomous apparatuses, and proactive detection and repair of malfunctions as soon as possible.

The self-diagnostic approach is suitable for very large-scale networks where administration of the devices affects costs. The flexibility is the result of an approach based on the use of a set of rules that allow the diagnostic rules to be updated or deactivated independently, with a strategy based on network administration feedback. The logic of the rules that produce the diagnostics is separate from the processing components that execute these rules, in the same way that an engine for execution of a script language is separate from the executed scripts. The aforementioned diagnostic agents are instances of sequences of diagnostic rules.

The diagnostic rules describe how the diagnostic-oriented logic and, therefore, the diagnostic agent are applied to the components that represent an atomic part of the status of the apparatuses. These atomic parts are known as monitored objects. The rules anticipate diagnostic results and further describe what actions must be taken. Different reactions to the diagnosis are possible from amongst the following: taking no action, generating a notification or initiating a self-repair procedure.

The concept of monitored objects can be extended. Instead of simply representing local functionalities of the apparatus, the monitored objects may also represent external functionalities. For example, a local monitored object can represent the status of a neighbouring apparatus in the network. In this case, the application of the local rules results in the diagnosis of two apparatuses by addressing a single apparatus. It is possible to multiply this arrangement and have, within a single apparatus, a set of monitored objects representing one or more external apparatuses. This therefore provides a diagnosis at the level of the node which produces a diagnosis in the group of apparatuses.

The strategy of triggering a self-diagnosis must be established for each apparatus. The diagnosis can be initiated periodically by a permanent monitoring strategy, or triggered by random events that are dependent on the type of service set up.

Figure 2:
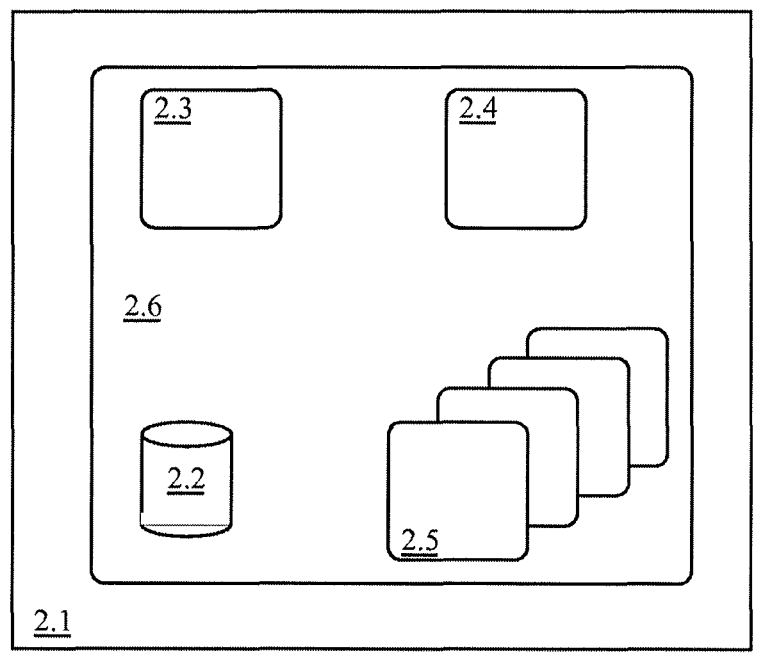
FIG. 2 shows the architecture of a device of the network, comprising a self-diagnostic module.

FIG. 2 shows the architecture of a device of the network 2.1 comprising a self-diagnostic module 2.6. This module comprises a database 2.2 that enables storing different objects stored in this diagnostic module. This database further stores the structure of the virtual network, for example references on the sons of the current apparatus, as well as on the father. In particular, the module comprises a status 2.3 that represents the operating state of the device. Operation of this module is governed by a set of rules 2.4. These rules are dynamic, and allow setting the status 2.3 out, as well as, if applicable, the actions aimed at repairing a malfunction. The module comprises a set 2.5 of monitored objects. These objects are elementary software objects that represent atomic parts of the apparatus, and/or external functionalities within remote apparatuses.

Figure 3:
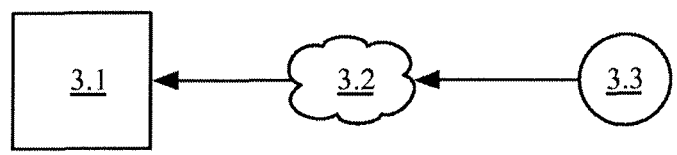
FIG. 3 shows the autonomous self-diagnostic mode.

The diagnostic agents that produce the diagnostics can operate in 3 different modes. The first mode is known as the autonomous self-diagnostic mode. In this mode, the apparatus performs a local diagnosis using the diagnostic agents representing only local functionalities. This mode is shown in FIG. 3, which shows an apparatus 3.3 that produces its self-diagnostic status. This status is then transferred via the virtual network 3.2 to a diagnostic server 3.1.

Figure 4:
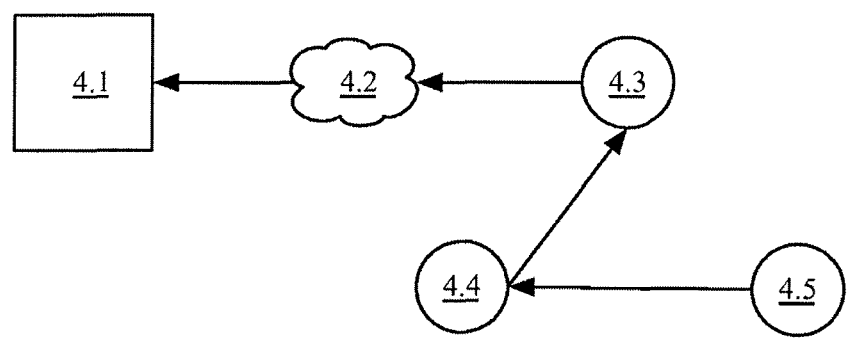
FIG. 4 shows the recursive self-diagnostic mode.

A second mode is known as the recursive self-diagnostic mode. In this mode, the apparatus performs a diagnosis using the local diagnostic agents representing local functionalities and an external object. This mode is shown in FIG. 4, which shows the object 4.5 performing its self-diagnosis. Its status is transmitted to the object 4.4. This object 4.4 also performs its self-diagnosis, the result of which it aggregates with the result received from the object 4.5. The resulting status is sent to the object 4.3, which does the same thing. The status of the object 4.3 therefore represents the operating state of the chain of objects 4.3, 4.4 and 4.5.

Figure 5:
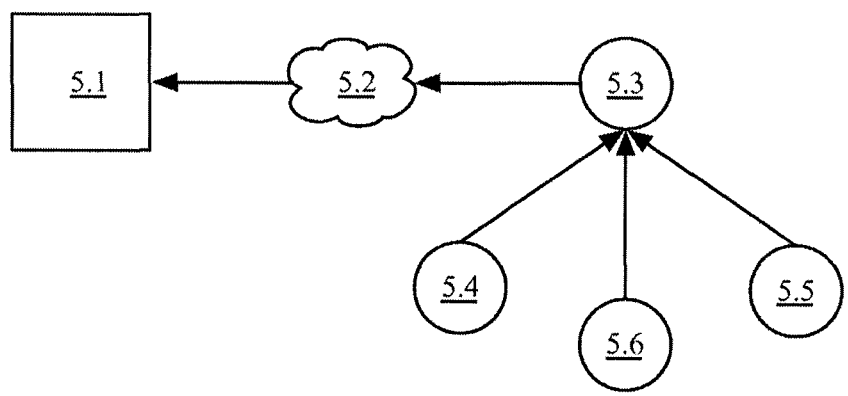
FIG. 5 shows the collaborative self-diagnostic mode.

A third mode is known as the collaborative mode. In this mode, the apparatus performs a diagnosis of nodes on a set of monitored objects representing its local functionalities and multiple external objects. This mode is particularly suitable for networks of apparatuses with a star topology. This mode is shown in FIG. 5, which shows the object 5.3 performing the diagnosis of the entire cluster of objects 5.3, 5.4, 5.5 and 5.6.

These three types of architecture can be combined and coexist in a single network. The self-diagnostic module of a root can be configured to apply the diagnostic function recursively to a set of apparatuses, so as to define the operational status of a cluster of apparatuses. The combination of the recursive and collaborative modes enables setting the diagnostic of a cluster of apparatuses out, by addressing only the root node of this cluster. It is not necessary to separately address the different nodes in order to obtain a diagnosis of the network as a whole. A request sent to a root node is sufficient.

It can thus be appreciated that, according to its location in the network, a node contains a set of monitored objects corresponding to its own Internet functionalities, and optionally a set of monitored objects corresponding to external apparatuses of its network environment. Typically this involves its sons in the topology of the built virtual network.

When a malfunction is detected on an apparatus of the network, actions of several types can be undertaken according to the category of the malfunction. The malfunctions will be classified for example in at least two categories, i.e. a first category of critical malfunctions, and a second category of slight malfunctions. Other categories can be defined if needed. If the malfunction is critical, it will imply an uplink transfert of this status to the father of the apparatus associated with the identifier of the faulty apparatus. If the malfunction is simply slight, the apparatus identifier will not be transferred uplink. In any node of the tree, it is possible to determine in the sub-tree-son that a malfunction has occurred. An aggregation of all of the nodes undergoing a critical malfunction is performed. The identifier of all of these nodes is thus obtained. If the malfunction is critical, it is possible to enter into direct communication with the faulty apparatus. If the malfunction is slight, a discovery request will be sent, which will browse the sub-tree in order to uplink the identifier of the faulty node. This discovery step will be performed only if needed.

The allocation of a category to a given malfunction is performed by the self-diagnostic rules, and can therefore be dynamically modified. It is thus possible to configure finely and dynamically the malfunctions that will be uplink to the root of the network, and those that remain local.

As far as possible, it is attempted to repair the malfunctions at the local level. The rules define a set of repair actions that can be undertaken in order to attempt to correct the problem when it is detected. These actions may comprise for example restarting the apparatus, or restoring a set of default parameters stored by the apparatus or by a neighbouring apparatus in the network. Applying local repair rules during the detection of a malfunction limits the need for communication between the root and the malfunctioning nodes.

Advantageously, a node has rules that allow it to reconfigure the virtual network in order to face up to malfunctions that affect its operation. For example, the loss of a physical communication link can be corrected by modification of the topology of the virtual network. The same can apply if a node is overloaded whilst it is acting as father for a large number of nodes of the virtual network, and reconfiguration can alleviate its load.

By default, the diagnostic intelligence associated with local functionalities of an apparatus is located in this apparatus. However, it is possible for the capacities of the apparatus to be limited to the extent where this is not possible. Delocalisation of this intelligence is then allowed within another apparatus in the close network environment of this apparatus. Typically this will be the father of the apparatus in the topology of the virtual network. However, this is not compulsory. Nevertheless, it is advantageous for the apparatus to be close in the virtual network, so as to limit the communications between the diagnostic intelligence host apparatus and the apparatus that is the target of this diagnosis.

Figure 6:
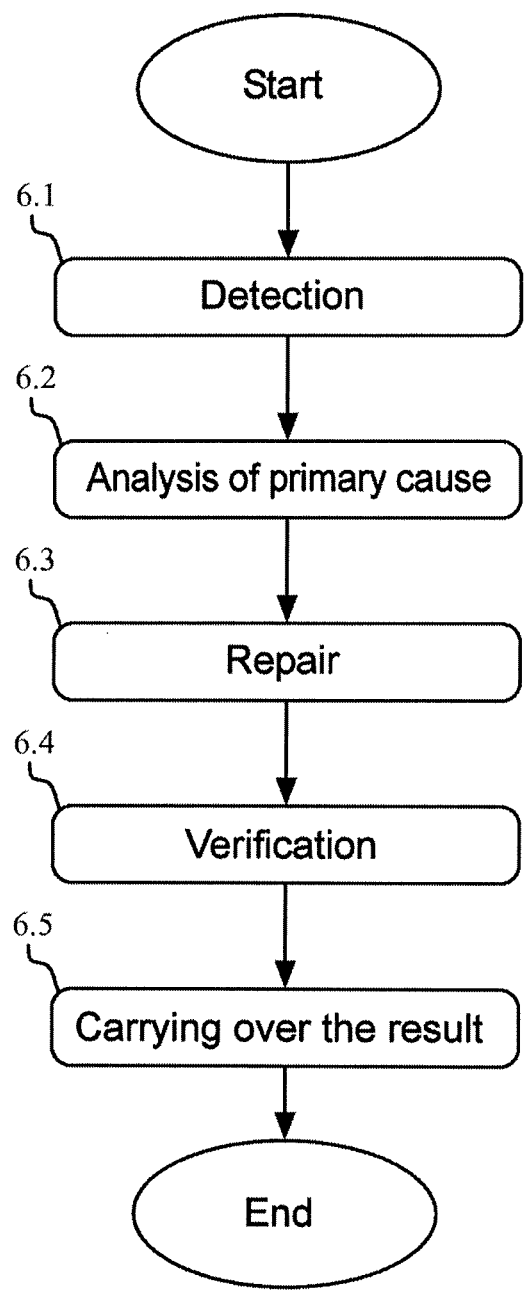
FIG. 6 is a flow chart showing a self-diagnostic operation.

FIG. 6 is a flowchart showing a self-diagnostic operation. During a first step 6.1, a malfunction is detected by one of the diagnostic agents. Since a malfunction has been detected, it is important to determine its primary cause. In fact, it is common for a first malfunction to imply a series of secondary malfunctions derived from this first malfunction. It is therefore important to trace the first malfunction and its primary cause, which is performed in the step 6.2. Application of the rules then leads to a step 6.3 of self repair, when this is possible, depending on the identified cause. Once this self repair step has been attempted, it is important to verify the correction of the malfunction during a step 6.4. The result is then reported to the father in the virtual network, which is the step 6.5.

The invention claimed is:

1. A device for communicating within a physical communication network with a set of apparatuses, comprising:
    at least one local diagnostic agent relating to local functionalities of the device for local self-diagnostics in the device;
    a database allowing managing a virtual hierarchical communication network with the set of apparatuses within the physical communication network; and
    a self-diagnostic module, executed by a processor, for determining a diagnostic status relating to a result of each local diagnostic agent of the device and of local diagnostic agents of the apparatuses that are dependent on said device in said virtual hierarchical communication network relating to external functionalities belonging to these apparatuses,
    wherein the self-diagnostic module is further configured for uplinking a locally detected malfunction according to a type of malfunction.

2. The device according to claim 1, wherein operation of the self-diagnostic module is governed by a set of dynamic rules.

3. The device according to claim 1, wherein the self-diagnostic module is adapted to perform self-repair operations.

4. The device according to claim 1, wherein the self-diagnostic module is further configured for responding to a request demanding the status of an entire sub-network of which the device is a root within the virtual communication network.

5. The device according to claim 1, wherein the self-diagnostic module is further adapted for producing a diagnosis in an autonomous self-diagnostic mode, by using diagnostic agents that represent only local functionalities.

6. The device according to claim 1, wherein the self-diagnostic module is further configured for producing a diagnosis in a recursive self-diagnostic mode, by using diagnostic agents that represent local functionalities and one external object.

7. The device according to claim 1, wherein the self-diagnostic module is further configured for producing a diagnosis in a collaborative self-diagnostic mode, by using diagnostic agents that represent local functionalities and multiple external objects.

8. A network of apparatuses according to claim 1, which form a system for diagnosing said network.

* * * * *